United States Patent Office 3,245,961
Patented Apr. 12, 1966

3,245,961
POLYUREAS FROM CAPROLACTAM-
BLOCKED ISOCYANATES
Charles A. Fetscher, Short Hills, N.J., and Edward
Schonfeld, New York, N.Y., assignors to Nopco Chemical Company, Newark, N.J., a corporation of New Jersey
No Drawing. Filed Aug. 28, 1962, Ser. No. 220,063
11 Claims. (Cl. 260—77.5)

This invention relates to a new composition of matter and a method for preparing the same. More particularly, this invention relates to thermally reversible blocking agents for systems involving isocyanates and amines or polyamines.

The isocyanates, and particularly the toluene diisocyanates, are known to yield valuable products with a large number of amines containing active hydrogens as determined by the Zerewitinoff method. This method is described in the "Journal of the American Chemical Society," 49, 3181 (1927). Typical amines containing active hydrogens are compounds having primary and secondary amine groups.

Reactions between diisocyanates, particularly the toluene diisocyanates, and amines containing active hydrogens proceed at a very rapid rate to form what is generally known as polyurea resins. These resins are particularly useful as castings, moldings, coatings and in the manufacture of rubber since they are extremely tough and tenacious. These polyurea resins can also be formed by any of the conventional foaming methods to produce a tough foam resin. Hithertofore these resins have found little use in the foams, coatings, moldings, etc. due to the fact that the reaction between the amine and the isocyanate takes place before the resinous mix prepared from the above reactants can be cast, molded, shaped, or otherwise utilized. For example, when it is desired to apply a coating composition comprising essentially a polyisocyanate terminated compound and an amine or a polyamine containing active hydrogens, the isocyanate groups tend to react with the hydrogen atoms of the amines or polyamines while the coating is still in the pot. Thus a sharply reduced pot life of the resin mix is obtained. When it is desired to use the reaction products of such components to form films or molds, the rapid cross-linking occurring between these components prevents them from being utilized in such systems because these systems will cure before they can be applied as a film or before they are molded into a final shape.

Others in the field have attempted to overcome this problem by utilizing the conventional, thermally-reversible, blocking agents for blocking isocyanates such as butyrolactam, propiolactam, phenyl methyl pyrazolone, aceto acetic ester, acetoacetone, valerolactam, benzimidazole, and many other compounds which include various oximes, phenols, imides, etc. Although these compounds have been reported to be successful in other reactive isocyanate systems as thermally reversible blocking agents, they have proven inadequate when utilized as a thermally reversible blocking agent for isocyanates in a system which contains amines or polyamines having at least one active hydrogen. This has prevented polyurea resins from becoming commercially successful in the aforementioned areas despite the many valuable properties of these polyurea resins.

In order that a compound should be a successful, thermally-reversible blocking agent, it must (1) prevent the reaction of two potentially reactive substances from occurring by blocking or tying up one of the substances such as the isocyanate radical to render it unreactive and must (2) be able to effectively release this blocked substance for reaction upon heating to an elevated temperature, generally from about 100° C. to about 175° C. For instance, compounds such as phenols, while they are effective blocking agents for isocyanates in system containing polyesters or polyethers having at least one active hydroxyl group, are unsuccessful as thermally reversible blocking agents for isocyanates in systems containing amines. In such a system, the amine tends to react almost instantaneously with the isocyanate to thicken and form a gel. Other compounds such as butyrolactam which is reported to be an effective thermally reversible blocking agent for isocyanates in polyether or polyester reactive systems do not release isocyanates in the presence of amines or polyamines containing at least one active hydrogen, even after heating the system to a temperature of over 175° C. Thus these compounds are useless as thermally reversible blocking agents for isocyanates in systems containing an amine or polyamine having at least one active hydrogen. Hence, prior methods of controlling the reaction between an isocyanate and an amine or polyamine compound containing at least one active hydrogen to produce a commercially utilizable polyurea have been entirely unsuccessful.

It is an object of this invention to provide a thermally reversible blocking agent for isocyanates in systems containing amines or polyamines having at least one active hydrogen.

It is a further object of this invention to provide a new and improved method for the production of polyurea resins.

It is a further object of this invention to provide a stable system for producing resins, which are the reaction products of polyisocyanates and amines or polyamines having more than one active hydrogen atom.

It is a further object of this invention to provide completely blocked isocyanates in the presence of an amine or polyamine having at least one active hydrogen in which the reactivity of the isocyanate is thermally controlled.

Other objects of this invention will in part be obvious and will in part appear hereinafter.

We have unexpectedly discovered that the foregoing objects are readily accomplished by completely reacting isocyanates, such as the toluene diisocyanates with caprolactam to form adducts of the isocyanate so that all of the free isocyanate groups are blocked with caprolactam. The completely blocked isocyanates are non-volatile, chemically and physically stable at room temperature and at temperatures below about 100° C. in the presence of amine or polyamine compounds having at least one active hydrogen, for protracted periods of time. However, when such completely blocked isocyanates are heated to temperatures above about 100° C., preferably above about 120° C., the isocyanate is completely regenerated and made available for reaction with the active hydrogen containing amine or polyamine compounds. Thus, it is readily apparent that this invention provides an advantageous method of thermally controlling the reactivity of isocyanates, such as toluene diisocyanates, with amines or polyamine compounds containing an active hydrogen atom.

The phenomenon whereby the reactivity of isocyanates can be thermally controlled in a system containing amines or polyamines, having at least one active hydrogen, by means of forming adducts with caprolactam so that all of the free isocyanates are blocked, is not completely understood. This effect is completely unpredictable and unexpected. This is true because it has been found that compounds similar to caprolactam such as butyrolactam, propriolactam, etc. as well as the other conventional blocking agents such as phenol, which are reported to be effective thermally reversible blocking agents for isocyanates in many systems containing at least one active hydrogen are completely ineffective as thermally reversible blocking agents for isocyanates in the presence of amine or polyamine compounds containing at least one active hydrogen.

In order to obtain a blocked isocyanate that is thermally reversible in the presence of compounds containing at least one amine group having at least one active hydrogen, all of the free isocyanate groups must be blocked with caprolactam. In order to accomplish this, at least one equivalent of caprolactam should be present in said reactive mixture for every equivalent of isocyanate present in the isocyanate compound. For example, in the case where the isocyanate compound is toluene diisocyanate, at least two moles of caprolactam should be present in the reactive mixture for each mole of toluene diisocyanate. Excess over stoichiometric amounts of caprolactam needed to react with all of the isocyanate groups in the isocyanate compound can be utilized without any deleterious effects. In fact, slight excesses of caprolactam are generally preferred to ensure complete blocking of all of the isocyanate groups. When less than the stoichiometric amount of the caprolactam which is needed to react with all the isocyanate groups present in the reaction mix, is used, the resultant adduct is not stable in the presence of any compound containing at least one active hydrogen including the aforementioned amines and polyamines, and reacts rapidly with these compounds. Also, these reactive adducts must be kept sealed and stored under a dry atmosphere since they are highly reactive with atmospheric moisture.

The completely blocked isocyanate can be prepared according to this invention by mixing the isocyanate containing compound and caprolactam at room temperature. Generally, it is desirable to speed up the reaction of the free isocyanate groups with caprolactam, therefore, temperatures ranging from 50° C. to 80° C. are preferably employed. If desired, the isocyanates and/or the caprolactam may be dissolved in a suitable inert solvent such as xylene, toluene, methyl ethyl ketone, o-dichlorobenzene, etc., prior to mixing the isocyanate and the caprolactam. The time required for the reaction to be complete will take from a few minutes to about 10 hours or more depending upon the temperature used. The reaction of the isocyanate and the caprolactam is determined to be complete when a sample of the blocked isocyanate is determined to have no free isocyanate groups upon titration with n-dibutylamine.

These adducts of caprolactam and isocyanates are highly stable at room temperature. This stability has produced many desirable effects, e.g., the normal volatility of the isocyanates, such as toluene diisocyanates, is sharply diminished. This in effect greatly reduces the toxic effects normally encountered in handling or utilizing toluene diisocyanates in various processes. Furthermore, the high degree of reactivity of the isocyanates contained within the adducts is effectively muzzled even when the adducts are incorporated or contacted at room temperature with compounds containing at least one active hydrogen as well as the amines or polyamines utilized in this invention. Also by utilizing the stability obtained by the blocking agents of this invention, a new method for producing polyurea resins by reacting isocyanates and amines containing at least two active hydrogens is obtained.

In the preparation of the completely blocked isocyanates of our invention, any isocyanate compound can be used. For forming the polyurea resins, it is preferred to use isocyanate compounds containing two or more free isocyanate groups. Representative examples of polyisocyanates found useful in our invention include the aliphatic polyisocyanate compounds such as toluene diisocyanate, tetramethylene diisocyanate, pentamethylene diisocyanate, hexamethylene diisocyanate, propylene-1,2-diisocyanate, butylene-1,2-diisocyanate, and ethylene diisocyanate; the cycloalkylene compounds such as cyclopentylene-1,3 diisocyanate, cyclohexylene-1,3 diisocyanate; the aromatic compounds such as m-phenylene diisocyanate, p-phenylene diisocyanate, 4,4'-diphenyl diisocyanate, 1,5-naphthalene diisocyanate; 2,4-toluene diisocyanate, 2,6-toluene diisocyanate, toluene triisocyanate and 1,4-xylene diisocyanate.

The polyisocyanates which can be blocked with caprolactam so as to be utilized in preparing polyurea resins by reacting with an amine or polyamine in accordance with this invention can be prepolymers which contain free polyisocyanate groups. In preparing a polymeric resin, the amine or polyamine compound should contain at least two reactive hydrogen groups. The prepolymers may be prepared by reacting hydroxy polyesters and polyethers with a polyisocyanate, such as toluene diisocyanate, said prepolymer having an isocyanate hydroxy ratio of at least two equivalents to one equivalent so as to provide a prepolymer having terminal isocyanate groups. These prepolymers are then reacted with caprolactam to block the isocyanate groups. Exemplary of some typical polyols that can be reacted with polyisocyanates to form prepolymers which can be completely blocked with caprolactam include glycerine, castor oil, trimethylol ethane, trimethylol propane, etc. Other polyethers which can be utilized in forming the prepolymers which can be utilized in accordance with this invention include polyoxyethylene glycols having molecular weights of 200, 400, 600, 800, 1,000, 2,000 and 4,000; polyoxypropylene glycols having molecular weight of 400 to 4,000, such as the Pluracol P series of Wyandotte Chemical Corp.; and copolymers prepared by the sequential addition of ethylene oxide to polyoxypropylene glycols. The copolymers can be represented by the formula

The molecular weight of the base, i.e., the polyoxypropylene portion of the molecule can vary, e.g., from about 600 to 2,500. Hence, in these instances, each $b$ in the above formula can vary from about 10 to 43. The oxyethylene content can vary from, e.g., 10% to 20% by weight of the total. Exemplary of these materials having a molecular weight of between 800 and 1,000 for the base portion of the molecule, i.e., the polyoxypropylene portion, and from 10% to 20% by weight of the ethylene oxide in the molecule are materials having a molecular weight of between 2,101 and 2,500 and having from 10% to 20% by weight of ethylene oxide in the molecule. Other polyethers which may be utilized in this invention are the ethylene oxide and propylene oxide condensates of glycerine, 1,2,6-hexanetriol, trimethylol propane, pentaerythritol, etc.

The polyesters resins which can be utilized to form prepolymers with isocyanate in accordance with this invention can be obtained by reacting one or more polyhydric alcohols having at least two hydroxyl groups with one or more dibasic acids or their anhydrides. Exemplary of the polyhydric alcohols which can be used in producing the polyesters are ethylene glycol, diethylene glycol, trimethylol propane, trimethylol ethane, glycerol, pentaerythritol, sorbitol, mannitol, etc., and mixtures of the above. Of course, when a diol is used, there may be present some amount of triol, tetrol, or other polyhydric alcohol having a functionality greater than two in order to incorporate branching into the polyester. Exemplary of the dibasic acid and anhydrides which can be used in the production of the polyester resin are malonic acid, oxalic acid, adipic acid, sebacic acid, azelaic acid, itaconic acid, succinic acid, terephthalic acid, isophthalic acid, phthalic anhydride, maleic anhydride, etc., and their mixtures.

The amine or polyamine compounds with which the isocyanate compounds or prepolymers can be reacted in accordance with this invention must have at least one active hydrogen attached to the nitrogen atom of the amine group. That is, these amines or polyamines must contain at least one primary or secondary amine group within the molecule. Of course, when polyurea resins are desired, then the amine or polyamine compound must have at least two reactive amine groups. Examples of such compounds include aniline, urea, thiourea, methyl amine, ethyl amine, butylamine, ethylene diamine, toluenediamine, phenylene diamine, diethylene triamine, propylene diamine, methylene bis (o-chloro aniline), dipropylene triamine, phenetidine, toluidine, triethylene tetramine, tetraethylene pentamine, imino bis (propyl amine), morpholino propyl amine, aminopropyl ethylene diamine, dibutylene triamine, dimethylamino propylamine, diethylamino ethylamine, etc. Compounds containing other functional groups such as —OH, —COOH, etc., besides the primary or secondary amino group can be utilized to react with the isocyanate compound or prepolymer. These compounds include urea, guanidine, cyanamide, n-phenyloldiethanolamine, aminoethyl ethanolamine, dicyandiamide, aminoethyl propanolamine, hydroxyethyl diethylene triamine, glycine, alanine, glutamic acid, 1-amino-2-hydroxyvaleric acid, 1-amino-2-hydroxyadipic acid, etc. Any organic compound which contains at least one primary or secondary amino groups may be utilized in accordance with this invention, no matter how substituted, as long as it contains no deleterious reactive substituents.

If a polyurea compound is desired, it is necessary that the amine contain at least two primary or secondary amino groups.

Polymeric polyamines can also be reacted with isocyanate compounds or prepolymers in accordance with our invention to produce the polyurea compounds. Exemplary of these polymeric polyamines are polymers obtained by reacting dicarboxylic acid such as adipic acid, dimerized oleic acid, fumaric acid, phthalic acid, maleic acid, etc. or anhydrides thereof with polyamines such as triethylene tetramine, tetraethylene pentamine, tripropylene tetramine, diethylene triamine, di-methylene triamine, etc. These polymers can have molecular weights varying from about 500 to 3,000. An additional example of polymeric polyamines which can be used in accordance with this invention are the polymers obtained by the reaction of acrylonitrile with polyols such as ethylene glycol, propylene glycol, hexanetriol, pentaerythritol etc. The polymeric amines are obtained from this reaction product by reducing the nitrile group by catalytic hydrogenation.

In forming a polyurea resin by reacting the isocyanate with an amine or polyamine compound containing at least two active hydrogens, it is necessary to release the isocyanate from the caprolactam adduct so that it can react with the amine or polyamine compound. This may be done by heating the adduct to a temperature of from about 100° C. to about 175° C. For commercial purposes, it is generally preferred to have a quick and controlled release of the isocyanates from the caprolactam adduct and hence temperatures of from about 120° C. to about 165° C. are preferably utilized. Temperatures higher than 175° C. can be utilized, but generally, since no additional advantage is obtained by utilizing such high temperatures, it is seldom necessary to utilize temperatures above 175° C. The time of release of all of the isocyanates from the caprolactam adduct so as to react with the amine or polyamine may vary from about 5 minutes to about 24 hours depending upon the temperatures utilized. Generally for a temperature of 145° C., approximately one-half hour is required to release all of the isocyanate from a caprolactam adduct and form the polyurea resin.

The stability of the adducts of isocyanates and caprolactam at temperatures of from room temperature to 90° C., coupled with the ease of release of the isocyanate from the adducts in the presence of primary and secondary amines or polyamine, provides those in the art with blocked isocyanates in which the reactivity and rate of reaction of the isocyanate group with a primary or secondary amine or polyamine group can be thermally controlled.

For a fuller understanding of the nature and objects of this invention reference is made to the following examples which are given merely to illustrate the invention and are not to be construed in a limiting sense.

*Example I*

This example is directed to the preparation of an adduct of caprolactam with a prepolymer of toluene diisocyanate.

(A) *Preparation of the prepolymer.*—469 grams of water free condensate of one mole of 2,2-methylene bis (para octyl phenol) with two moles of ethylene oxide was dissolved in 231 grams of xylene. This solution was added dropwise to a solution consisting of 308 grams of toluene diisocyanate (80% by weight of the 2,4 isomer and 20% by weight of the 2,6 isomer) dissolved in 105 grams of xylene while maintaining the temperature at about 80° C. After all of the solution containing the condensate was added, the temperature of the mixture was maintained at about 80° C. for two hours until an isocyanate content of 9.4% determined by titration with di-n-butyl amine was reached. This indicated that all the free hydroxyl had reacted with the toluene diisocyanate to form a prepolymer. Upon cooling to room temperature, an amber solution was obtained.

(B) *Formation of the adduct.*—1,089 grams of the amber prepolymer solution prepared above were added to a solution of 197 grams of caprolactam dissolved in 84 grams of xylene. After all of the prepolymer had been added, the clear resulting solution was heated to about 80° C. This temperature was maintained for a period of about four hours. Upon cooling to room temperature, this system remained a clear solution. A small sample of this solution was titrated with n-dibutylamine which indicated that no free isocyanate groups were present in the resulting prepolymer caprolactam product. This test indicated that a caproalctam and isocyanate terminated prepolymer reacted to form an adduct.

*Example II*

This example is directed to preparation of an adduct of phenol with a toluene diisocyanate prepolymer.

100 grams of the prepolymer solution prepared in Example I-A above were added to a solution of 15 grams of phenol dissolved in 27 grams of xylene. After all of the prepolymer had been added the resulting clear solution was heated to 80° C. This temperature was maintained for a period of about ten hours. After this period, the mixture was cooled to room temperature. The resultant product was a clear solution. A small sample of said solution was titrated with n-dibutylamine which indicated that practically no unreacted isocyanate was present in the resulting adduct.

*Example III*

This example shows a comparison of the stability of caprolactam blocked prepolymers and the phenol-blocked prepolymers at room temperatures in the presence of the polyamines.

Two test samples were prepared as follows:

(A) *First test sample.*—To 100 grams of the caprolactam blocked prepolymer solution prepared in Example I, there was added 9 grams of xylene so as to prepare a dilute solution. One gram of this dilute solution was added at room temperature under constant stirring to a beaker containing 0.28 gram of Versamide 115 (polyamine polyamide polymer having an equivalent weight of 260 prepared by reacting dimerized oleic acid with diethylene triamine) dissolved in 0.26 gram of xylene. After the blocked prepolymer was completely added, a clear solution formed indicating that none of the adduct reacted with the polyamine polyamide prepolymer. This solution was coated on 8 inch steel plates with a 3 mil Bird Applicator. Upon standing overnight at room temperature the coating was still a tacky liquid indicating that the isocyanate had not reacted with the polyamine polymer. Upon curing in an oven at a temperature of about 140° C. for about 30 minutes, a solid dry tack-free coating was attained on the steel plates. This indicated that the isocyanate had reacted with the polymeric polyamine.

(B) *Second test sample.*—Into a second beaker containing 0.27 gram of Versamide 115 was added 1.0 gram of the prepolymer blocked with phenol prepared in Example II, at room temperature under constant stirring. The resultant mixture was a clear solution which indicated that the isocyanate had not reacted with the polyamine. Upon standing for five minutes at room temperature, a thick gel formed which indicated that the isocyanate had reacted with the polymeric polyamine.

Thus, from a comparison of the two test samples, it is readily apparent that phenol is ineffective as a blocking agent for isocyanate in the presence of an amine at room temperature whereas caprolactam is effective in blocking isocyanate in an amine system at room temperature.

*Example IV*

This example is directed to the preparation of an adduct of caprolactam with a prepolymer of toluene diisocyanate.

(A) *Preparation of the prepolymer.*—247 grams of water-free Pluracol TP-740 (0.33 mol of a polypropylene oxide adduct of trimethylol propane having an average molecular weight of 741) was dissolved in 280 grams of a mixture comprising 50% by weight Cellosolve acetate and 50% by weight xylene. This solution was added dropwise to 174 grams (1.0 mole) of toluene diisocyanate (80% by weight of the 2,4 isomer and 20% of the 2,6 isomer) containing 5 drops of o-chlorobenzyl chloride in a moisture-free nitrogen atmosphere while maintaining the temperature of this mixture at about 45° C. After all of the polypropylene glycol was added, the temperature of the mixture was raised to 80° C. This temperature was maintained for two hours. Upon cooling to room temperature, a colorless solution was obtained. Analysis of a sample of this prepolymer solution by titration with n-dibutylamine indicated an isocyanate content of 5.99%. This indicated that approximately the theoretical amount of isocyanate had reacted with the glycol to form prepolymer.

(B) *Formation of the adduct.*—100 grams of the clear prepolymer solution prepared above were added to a solution of 15.1 grams of caprolactam dissolved in 10 grams of Cellosolve acetate. After all the prepolymer had been added, the clear resulting solution was heated to 80° C. This temperature was maintained for a period of about ten hours. Upon cooling to room temperature, this system remained a clear solution. A small sample of this solution was titrated with n-dibutylamine which indicated that no free isocyanate groups were present in the resultant prepolymer caprolactam product. This test indicated that a caprolactam and isocyanate terminated prepolymer reacted to form an adduct.

*Example V*

This example is directed to the preparation of an adduct of phenol with a toluene diisocyanate prepoymer.

100 grams of the prepolymer solution prepared in part (A) of Example IV were added to a solution of 12.6 grams of phenol dissolved in 9.0 grams of Cellosolve acetate. After all the prepolymer had been added, the resulting clear solution was heated to 80° C. This temperature was maintained for a period of about ten hours. After this period, the mixture was cooled to room temperature. The resultant product was a clear solution. A small sample of said solution was titrated with n-dibutylamine which indicated that practically no unreacted isocyanate was present in the resulting adduct.

*Example VI*

This example is directed to the preparation of a polyurea resin formed from a caprolactam blocked isocyanate prepolymer and diethylene triamine.

20 grams of the adduct prepared according to Example IV was added under constant stirring to 0.61 gram of diethylene triamine at room temperature. The mixture remainer liquid. This indicated that none of the blocked isocyanate in the prepolymer reacted with the triamine. This mixture was allowed to stand for one week at room temperature. At the end of this period the mixture was still liquid which indicated that the isocynate present in the prepolymer had not reacted with diethylene triamine. The mixture was then coated on 8 inch steel plates with a Bird Applicator set at 3 mil. The coated steel plates were placed in an oven at a temperature of 150° C. for about 30 minutes. At the end of this period the coated plates were removed from the oven and the tacky liquid coating had become a dry tack-free solid coating which indicated that the isocyanate had been released from the adduct and had reacted with the amine. This coating had a pencil hardness of 3H, an impact resistance of 160 inches per pound on both direct and reverse sides of the film panel. The coating also had good flexibility which was indicated by the fact that the coating could be bent sharply around an ⅛ inch mandred without cracking.

*Example VII*

This example is directed to the preparation of a polyurea resin formed from a phenol blocked isocyanate prepolymer and diethylene triamine.

20 grams of the phenolic blocked adduct prepared according to Example V was added under constant stirring to 0.51 gram of diethylene triamine at room temperature. After standing for 15 minutes at room temperature, the mixture gelled forming a thick solid. This indicated that the isocyanate prepolymer had been released from the adduct so as to react with the diethylene triamine.

*Example VIII*

This example is directed to the preparation of a polyurea resin formed from a butyrolactam blocked isocyanate prepolymer and diethylene triamine.

100 grams of the prepolymer solution prepared according to Example IV-A was added to a beaker containing 11.4 grams of butyrolactam and 7 grams of Cellosolve acetate under constant stirring. After all of the prepolymer was added, the mixture was then heated for 10 hours at a temperature of 80% C. A thick tacky liquid formed indicating that an adduct of butyrolactam and isocyanate prepolymer had formed. The adduct had an isocyanate content of 0% which was determined by titrating a small sample with n-dibutylamine. This adduct was then cooled to room temperature.

20 grams of the adduct was added under constant stirring to 0.65 gram of diethylene triamine at room temperature. This mixture was allowed to stand at room temperature for one week. After this period it was observed that the mixture was still liquid which indicated that none of the isocyanate of the prepolymer reacted with the diethylene triamine. This mixture was coated on 8 inch steel plates with a 3 mil Bird Applicator. The coated plate was placed in an oven at a temperature of 150° C. for a period of 45 minutes. At the end of this period the coated plate was removed from the oven. It was observed that the coating on the coated plate was still a tacky liquid. This indicated that the isocyanate had not been released from the adduct even after heating to 150° C. for a period of 45 minutes.

By comparing the results of Examples VI, VII and VIII, it is evident that caprolactam provides an excellent thermally reversible blocking agent for systems involving isocyanates and amines. The conventional thermally reversible blocking agents such as butyrolactam and phenol are not, as shown by Examples III, VII and VIII, thermally reversible blocking agents for isocyanates in amine or polyamine systems. This is clearly shown by the fact that the isocyanate is not held in an unreacted condition by the phenol in the presence of amines and that butyrolactam does not release isocyanate in amine or polyamine systems thereby preventing it from reacting with the amine or polyamine. On the other hand caprolactam, as shown in Example VI, provides an effective thermally reversible blocking agent for isocyanates, in that the adducts of caprolactam and isocynate are stable at room temperature in the presence of amines or polyamines and that at elevated temperatures, the isocyanate is released from the caprolactam adducts so that it may react with the amine or polyamine.

Having described our invention, what we claim is new and desire to secure by Letters Patent is:

1. A method of reacting an amine with an isocyanate adduct comprising (1) mixing said adduct with a material selected from the group consisting of an organic aliphatic substance and an organic aromatic substance containing at least one functional group selected from the group consisting of primary and secondary amino groups to form a mixture and (2) heating said mixture to a temperature of from about 100° C. to about 175° C. so as to release isocyanate from said adduct so as to allow said isocyanate to react with said material, said adduct having been prepared by providing a mixture of an organic compound containing at least one isocyanate group and caprolactam, said caprolactam being present in said mixture in an amount sufficient to react with all of the isocyanate groups in said compound and reacting said compound and said caprolactam at a temperature of from about room temperature to about 80° C. so as to form an adduct of said caprolactam and said compound.

2. A method of reacting a polyamino compound with an isocyanate adduct comprising (1) mixing said adduct with a polyamino compound containing at least two amino groups to form a mixture, each of said amino groups containing at least one reactive hydrogen and (2) heating said mixture to a temperature of from about 100° C. to about 175° C. so as to release isocyanate from said adduct so as to allow said isocyanate to react with said polyamino compound, said adduct having been prepared by providing a mixture of an organic compound containing at least two active isocyanate groups and caprolactam, said mixture containing at least one equivalent of caprolactam for every equivalent of active isocyanate contained within said compound and reacting said compound and said caprolactam at a temperature of from about room temperature to about 80° C. so as to form an adduct of caprolactam and said compound.

3. The process of claim 2 wherein said polyamine is a polymer containing at least two primary amino groups.

4. A method of reacting a polyamino compound with an isocyanate adduct comprising mixing said adduct with a polyamino compound containing at least two amino groups, each of said amino groups containing at least one reactive hydrogen and heating said mixture to a temperature from about 100° C. to about 175° C. so as to release isocyanate from said adduct so as to allow said isocyanate to react with said polyamino compound, said adduct having been prepared by providing a mixture of prepolymer containing at least two reactive isocyanate groups and caprolactam, said mixture containing at least one mole of caprolactam per equivalent of reactive isocyanate contained within said prepolymer and recating said prepolymer and said caprolactam at temperatures of from about room temperature to about 80° C. so as to form an adduct of said prepolymer and said caprolactam.

5. The process of claim 4 wherein said polyamino compound is a polymer containing at least two primary amino groups.

6. The process of claim 4 wherein said prepolymer is a reaction product of toluene diisocyanate and a propylene oxide adduct of trimethylol propane.

7. A method of reacting a polyamino compound with an isocyanate adduct comprising mixing said adduct with a polyamino compound containing at least two amino groups to form a mixture, each of said amino groups having at least one reactive hydrogen atom and heating said mixture to a temperature of from about 100° C. to about 175° C. so as to release isocyanate from said adduct so as to allow said isocyanate to react with said polyamino compound, said adduct having been prepared by providing a mixture of toluene diisocyanate and caprolactam, said mixture containing at least two moles of caprolactam for each mole of said diisocyanate and reacting said diisocyanate and said caprolactam at temperature of from about room temperature to about 80° C. so as to form an adduct of said toluene diisocyanate and said caprolactam.

8. A thermally reversible system, said system being stable at temperatures up to 100° C., said system comprising (1) a reaction product of an organic compound containing at least one isocyanate group and caprolactam, said reaction product being formed by the reaction at a temperature of from about room temperature to about 80° C. of at least on equivalent of caprolactam for each equivalent of isocyanate contained within said organic compound and (2) a material selected from the group consisting of an organic aliphatic substance and an organic aromatic substance containing at least one functional group selected from the group consisting of primary and secondary amino groups.

9. A thermally reversible system, said system being stable at temperatures of from about 20° C. to about 80° C., said system comprising (1) a reaction product of a prepolymer containing at least two reactive isocyanate groups and caprolactam, said reaction product being formed by reacting at a temperature of from about room temperature to about 80° C. at least one mole of caprolactam for each equivalent of reactive isocyanate contained within said prepolymer and (2) a polymeric compound having at least two amino groups, each of said amino groups having at least one reactive hydrogen.

10. The system of claim 9 wherein said prepolymer is the reaction product of toluene diisocyanate and a propylene oxide adduct of trimethylol propane.

11. A thermally reversible system, said system being stable at temperatures of up to 100° C., said system comprising (1) a reaction product of toluene diisocyanate and caprolactam, said reaction product being formed by reacting at a temperature of from about room temperature to about 80° C. two moles of caprolactam for each mole of toluene diisocyanate and (2) a polyamine compound having at least two amino groups, each of said amino groups, each of said amino groups having at least one reactive hydrogen.

References Cited by the Examiner
UNITED STATES PATENTS

| | | | |
|---|---|---|---|
| 2,698,845 | 1/1955 | Mastin et al. | 260—78 |
| 2,720,508 | 10/1955 | Melamed | 260—77.5 |
| 2,888,438 | 5/1959 | Katz | 260—77.5 |

OTHER REFERENCES

Morgan, SPE Journal, June 1959, pp. 485–495.

DONALD E. CZAJA, *Primary Examiner.*

LEON J. BERCOVITZ, JOSEPH L. SCHOFER,
*Examiners.*